United States Patent [19]
Wright

[11] 3,951,106
[45] Apr. 20, 1976

[54] KENNEL

[76] Inventor: William L. Wright, 5230 Guilford, Indianapolis, Ind. 46220

[22] Filed: Oct. 29, 1974

[21] Appl. No.: 518,520

[52] U.S. Cl. .................................................. 119/19
[51] Int. Cl.² ........................................... A01K 1/00
[58] Field of Search .................... 119/19, 20, 16, 15

[56] References Cited
UNITED STATES PATENTS

| | | | |
|---|---|---|---|
| 1,462,107 | 7/1923 | Holman | 119/20 |
| 3,618,568 | 11/1971 | Breeden | 119/19 |
| 3,791,348 | 2/1974 | Marnett | 119/19 |

Primary Examiner—Hugh R. Chamblee

[57] ABSTRACT

A modular kennel having an individual exercise area and enclosure for each dog. Each enclosure has a door which can be operated by the dog to allow access to the adjacent exercise area in addition to having a gate leading to a common area for grooming, cleaning and general storage. The kennel is comprised of a number of kennel units which are attached to one another to form buildings of various sizes which in turn are connected by corridors. The net effect is a kennel which is efficient, sanitary and aesthetically pleasing.

4 Claims, 6 Drawing Figures

KENNEL

BACKGROUND OF THE INVENTION

1. Field of the Invention:

This invention relates to the kenneling of animals.

2. Description of the Prior Art:

The use of dog kennels of various designs is common throughout the world. These kennels generally suffer from several common problems. The first problem is that in order to make a kennel economically feasible it must be large enough to accommodate a large number of dogs. This in turn generally requires a location in general proximity to a densely populated area. Since kennels are not usually architecturally attractive, they are generally not welcome in most communities. Therefore, there has been a long-felt need for a kennel which combines efficiency and size with aesthetically pleasing architectural design.

In addition, most existing kennels suffer from the development of unsanitary conditions due to repeated use of the same facilities by a variety of dogs. These sanitary problems have resulted in the general association of common canine diseases and afflictions with kennels. Examples of such afflictions are worms and fleas, both of which generally thrive in kennels.

The services which normally accompany the boarding of a dog in a kennel are grooming, washing, feeding and exercising. These services are generally made expensive by the fact that each dog requires individual attention and by the fact that the areas for performing these services are usually isolated from the dog's area of confinement, thus requiring the expenditure of significant amounts of time for each animal being kenneled. Therefore, distinct advantages are enjoyed by the kennel of this invention where each dog has its own individual run or exercise area and where other kennel services such as grooming, feeding and cleaning can be performed at several central locations convenient to a number of dogs.

Other kennels have not had the advantages offered by the kennel of this invention, although other attempts to solve these problems are typified by U.S. Pat. No. 3,791,348 (1974) to Marnett and U.S. Pat. No. 3,718,120 (1973) to Schwartz et al, both of which disclose automated kennels.

SUMMARY OF THE INVENTION

This invention relates to a modular kennel unit comprising several linearly arranged enclosures, there being vertical walls separating each individual enclosure from other enclosures, each of the enclosures being covered by a first roof and having a first opening and a second opening, each of which is adapted to allow a dog to pass through; and having gate means to open or close the corresponding one of the second openings, the gate means permitting entrance to and exit from each individual enclosure of the several enclosures; a wall spaced from the several enclosures and the second openings so as to define a corridor between the wall and some of the enclosures and second openings, the corridor providing access to the second openings of some of the enclosures; a second roof over the corridor between the wall and the several enclosures, the second roof extending for the combined length of the several enclosures; one of the roofs extending out from above the several enclosures for drainage purposes; and the kennel unit being adapted to be combined with three additional kennel units of similar design in a pinwheel configuration.

It is an object of this invention to provide a kennel unit which is efficient in operation while at the same time being aesthetically pleasing in architectural appearance.

It is a further object of this invention to provide a kennel which is sanitary in operation and in which sanitary standards can be conveniently and regularly maintained.

It is a still further object of this invention to provide a kennel unit which is convenient to the various servicing areas necessary for the boarding of dogs.

It is an additional object of this invention to provide a kennel unit which has an individual exercise area adjacent to each enclosure.

These and other objects of this invention will become apparent from the following description of the preferred embodiment.

DESCRIPTION OF THE PREFERRED EMBODIMENT

Figure 1:
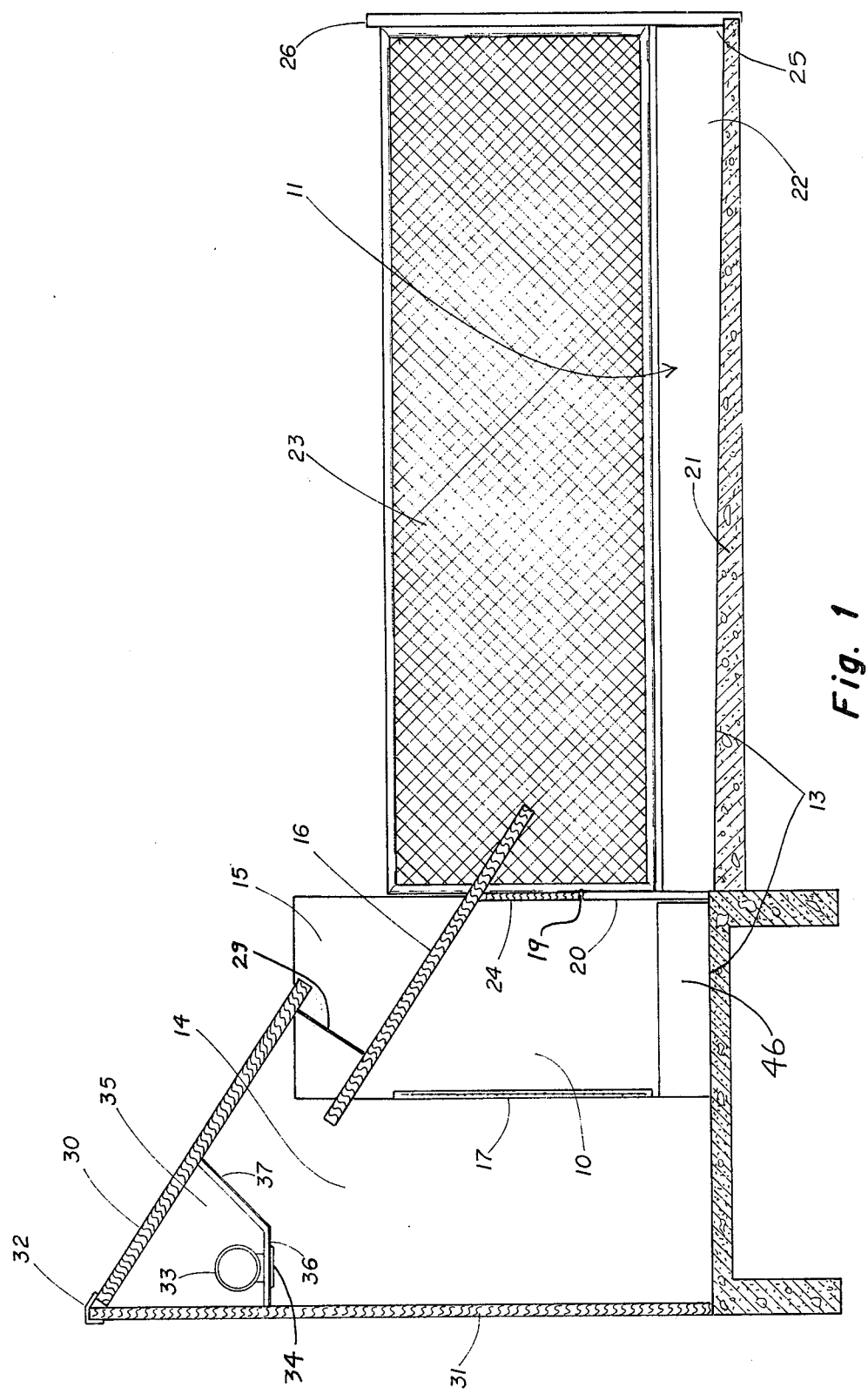
FIG. 1 is a vertical cross sectional view of the kennel subunit of this invention taken along the lines 1—1 of FIG. 2.
Figure 2:
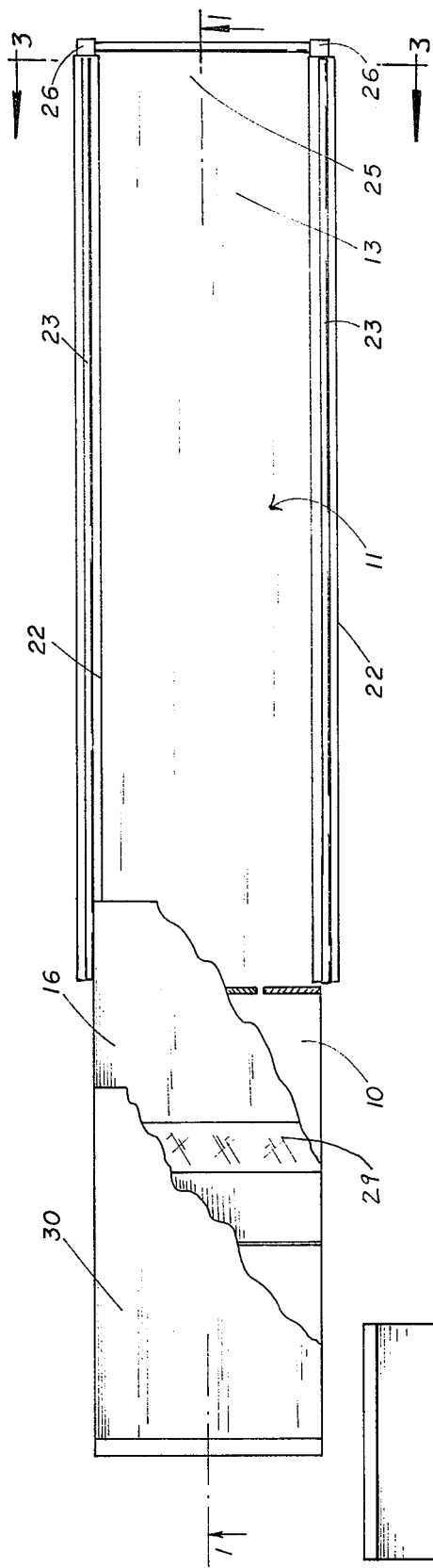
FIG. 2 is a top view of the kennel subunit of FIG. 1 with portions of the roof cut away.
Figure 3:
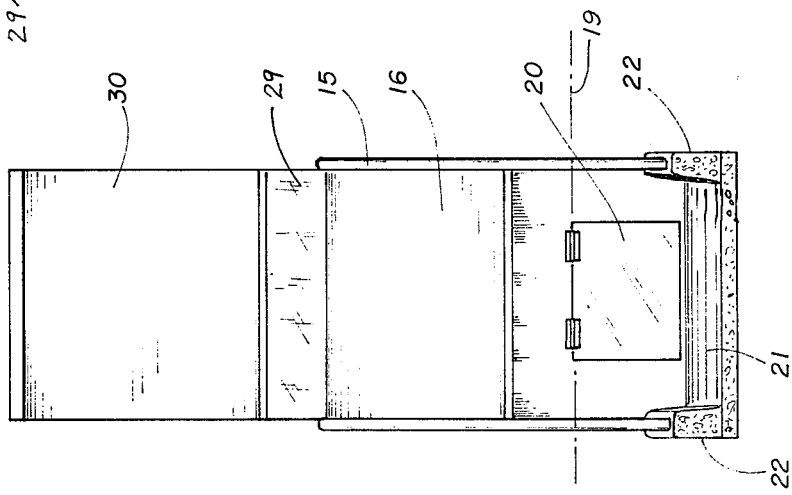
FIG. 3 is a vertical cross sectional view of the kennel subunit of FIG. 1 taken along the lines 3—3 of FIG. 2.

For the purposes of promoting an understanding of the principles of the invention, reference will now be made to the embodiment illustrated in the drawings, and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

For purposes of this application, the term kennel subunit is used to refer to the area necessary to confine one dog and includes an enclosure 10 and an adjacent exercise area 11, alternatively referred to as a run. The kennel subunits can be combined into kennel units which generally include seven such subunits. Four of the kennel units are combined to form a kennel building. The kennel building generally includes 28 kennel subunits and thus conveniently boards 28 animals. When four kennel units are combined to form a building, a common area 12 and four corridors 14 are defined. This common area can be used for grooming, cleaning and general storage purposes and is ideally located to service the 28 surrounding subunits. The kennel buildings can then be connected to form a kennel complex, which would also include other service buildings such as an administration building, a veterinary building, a training pavillion and others as may be desired.

As described supra, the kennel subunit is the area and structure necessary to confine one dog. This subunit consists basically of an enclosure 10 and an exercise area 11. The enclosure is constructed using laminated panels 15, 16 and 24. Preferably, the basic panel is constructed as a sandwich of two sheets of galvanized steel prefinished with a baked enamel coating and separated by a three-inch thick, half-inch closed cell honeycomb core providing air space and insulation. The floor surface 13 of both the enclosure 10 and the exercise area 11 is concrete. A pair of vertical wall panels 15 form the sides of the enclosure 10. These wall panels 15 are mounted to the concrete floor surface 13. The same basic laminated panels as are used for vertical wall panels 15 are used for the lower roof structure 16. A gate 17 allows entrance and exit to and from the enclosure 10 from the common area 12 or corridor 14. The gate 17 is preferably of a porous material such as chain link fencing. Connecting the enclosure 10 to the exercise area 11 is a door 20 which is mounted on panel 24 which forms a part of the enclosure 10. Door 20 is freely movable both into the enclosure 10 and into the exercise area 11. The door 20 is hinged about axis 19 so as to allow free movement of the door in both directions.

The exercise area 11 comprises an inclined surface of concrete 21 inclined downwardly from the floor surface 13 of the enclosed area 10. This allows rainfall and other natural waterfall to aid in the cleaning and sanitation of the exercise area 11. Bordering the exercise area 11 are two concrete curbs 22 which extend upwardly from the inclined surface of concrete 21 of the exercise area 11. These curbs 22 may be varied in height, although a height of approximately one foot four inches is preferred. Mounted on top of these curbs 22 is a fence 23 preferably a chain like fence, which runs the length of the exercise area 11. At the base 25 of the dog exercise area 11 two corner posts 26 are mounted. A fence 27 similar to fence 23 is mounted between posts 26 thus completing the fencing of the entire perimeter of the exercise area 11.

Spaced apart from the lower roof structure 16 is an upper roof structure 30 made from the same laminated panels as used for lower roof structure 16. The upper roof structure 30 is spaced from lower roof structure 16 by a transluscent plastic panel 29 which also holds upper roof structure 30 in place. The upper roof structure 30 is fixedly attached to either an inner wall panel 31 by bracket 32 or to support beams 28. Heating and cooling ducts 33 are located in an enclosed ceiling space 35. Ceiling space 35 is defined by the intersection of upper roof structure 30 with inner wall panel 31 in addition to ceiling panels 36 and 37. The heating and cooling duct 33 is connected to a standard heating and cooling unit with vents 34 in ceiling panel 36 located throughout the kennel building. This allows for the complete heating, cooling and other ventilation of the dog kennel.

Figure 4:
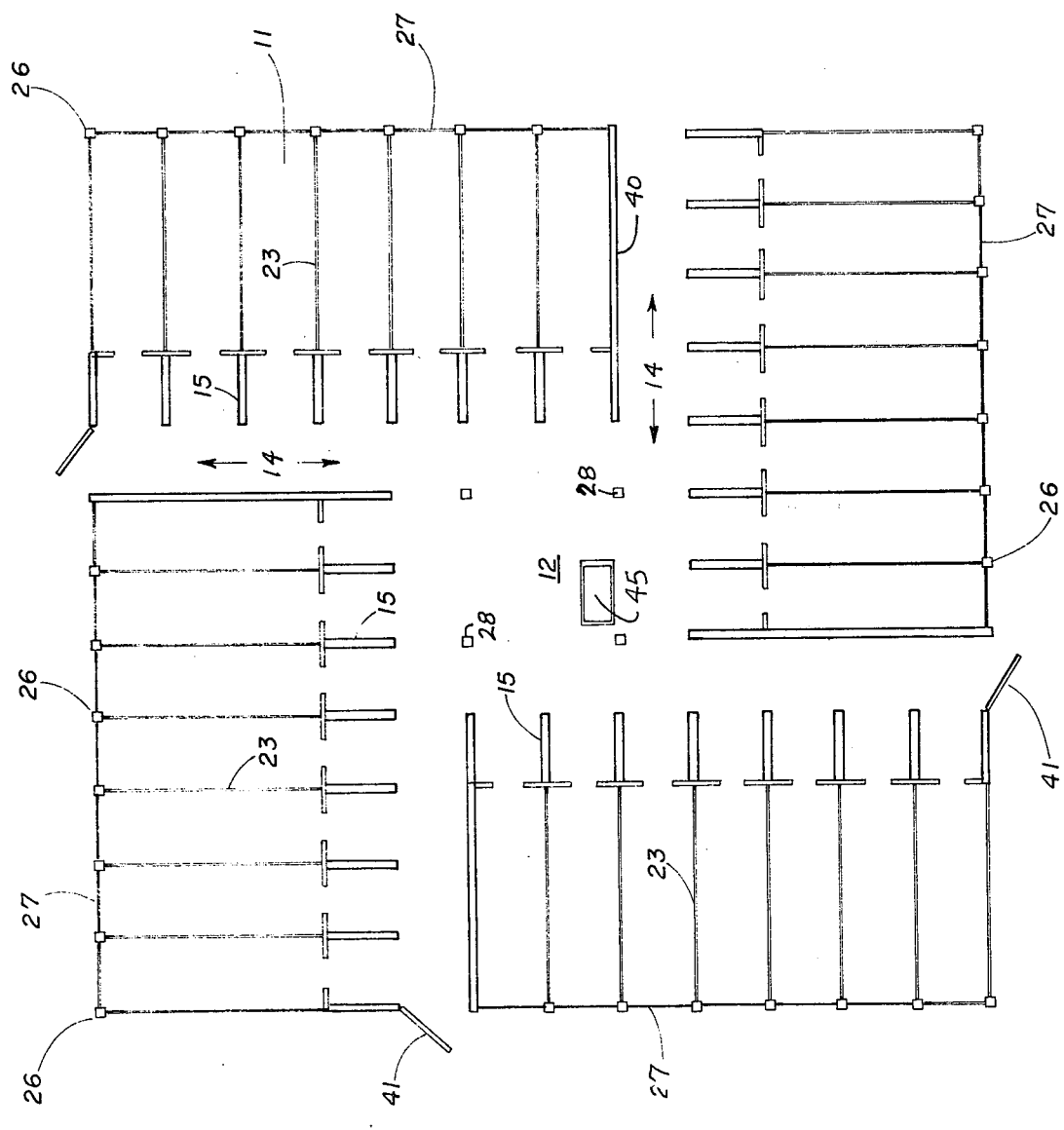
FIG. 4 is a top view of four kennel units joined to form a kennel building and having the roof and doors to the individual enclosed areas and exercise areas removed.
Figure 5:
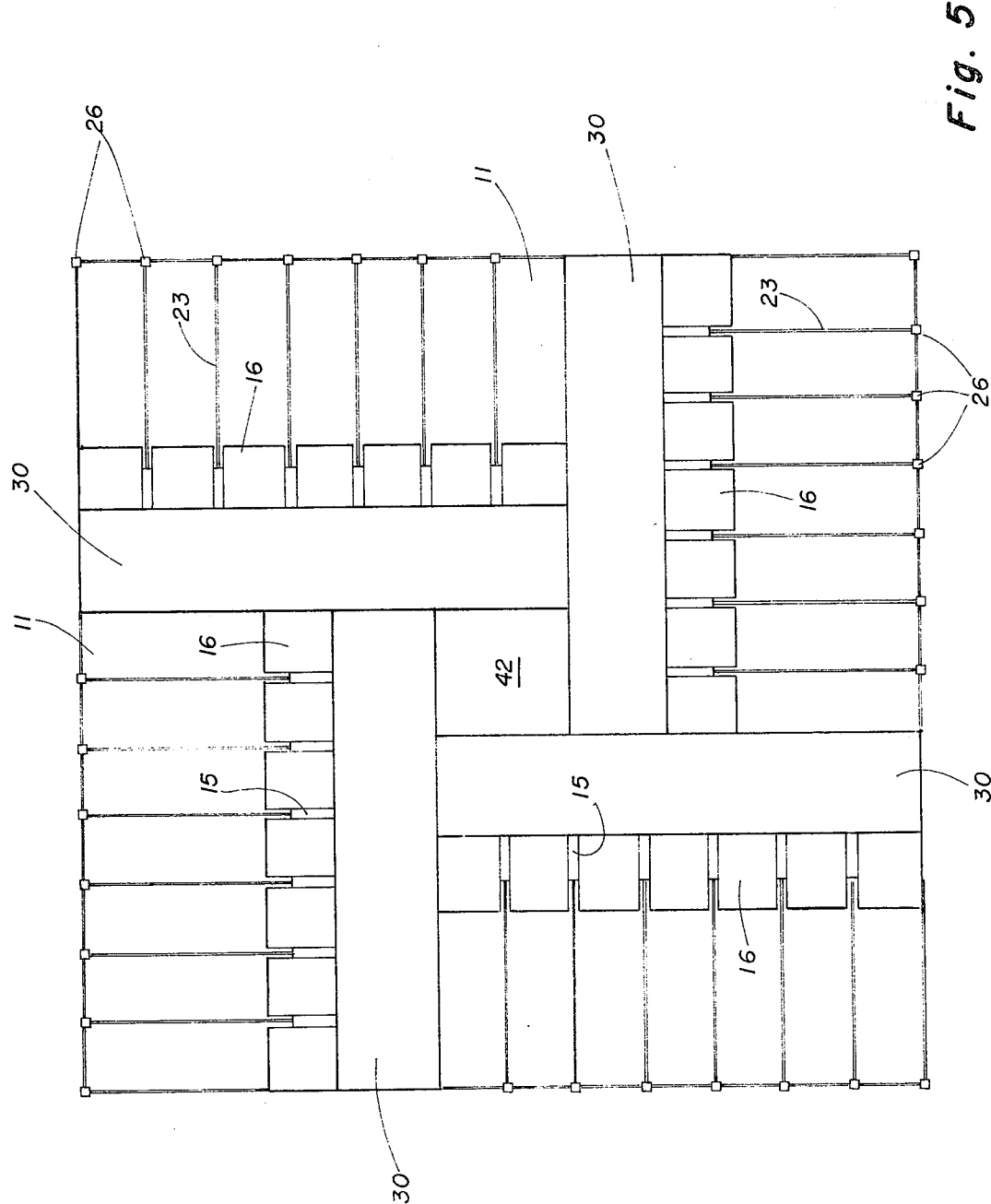
FIG. 5 is a top view of the kennel buildings of FIG. 4 with the roof in place.

When a plurality of the kennel subunits are combined to form a kennel unit, typically seven kennel subunits are used. In this manner the kennel unit is formed having seven enclosures 10 and seven individual exercise areas 11 adjacent to the enclosures. In addition, a wall 40 is formed from panels 31 along approximately 4/7 the length of the common area by inner wall panels 31 as shown more particularly in FIG. 4. At one end of the corridor 14 is a door unit 41 which allows either access to the outside or if desired may be interconnected with additional kennel units to form a corridor from unit to unit.

When four kennel units are combined at right angles to one another, they form a pinwheel arrangement having a common area 12 which can be conveniently covered by a ceiling 42 and corridors 14 which are covered by roofs 30. This permits the desired central location of grooming, cleaning, storage and feeding facilities for all of the twenty-eight animals which can be stored in a kennel building. For convenience, the combination of four kennel units into a pinwheel configuration shall be referred to as a kennel building. These kennel buildings are conveniently interconnected with other kennel buildings as mentioned previously by means of doors 41 which interconnect corridors 14 formed by gates 17 and inner wall 40. In this fashion an entire complex of kennel buildings can be efficiently joined so as to make maximum use of space and to allow convenient heating and air conditioning of the entire kennel area. The materials used allow sanitary conditions to be maintained with reasonable convenience. In addition, the slant of roof members 16 and 30 allows the flow of rain to be in a manner such that it will flow down the inclined surface 21 of exercise area 11, thus washing away any excrement that may be present into a walkway area 44 which can be conventionally cleaned on a regular basis. This allows for improved sanitary conditions. Fences 23 and 27 are preferably five foot chain link fences, although this dimension and type can be varied depending on the size of dogs intended to be confined.

Figure 6:
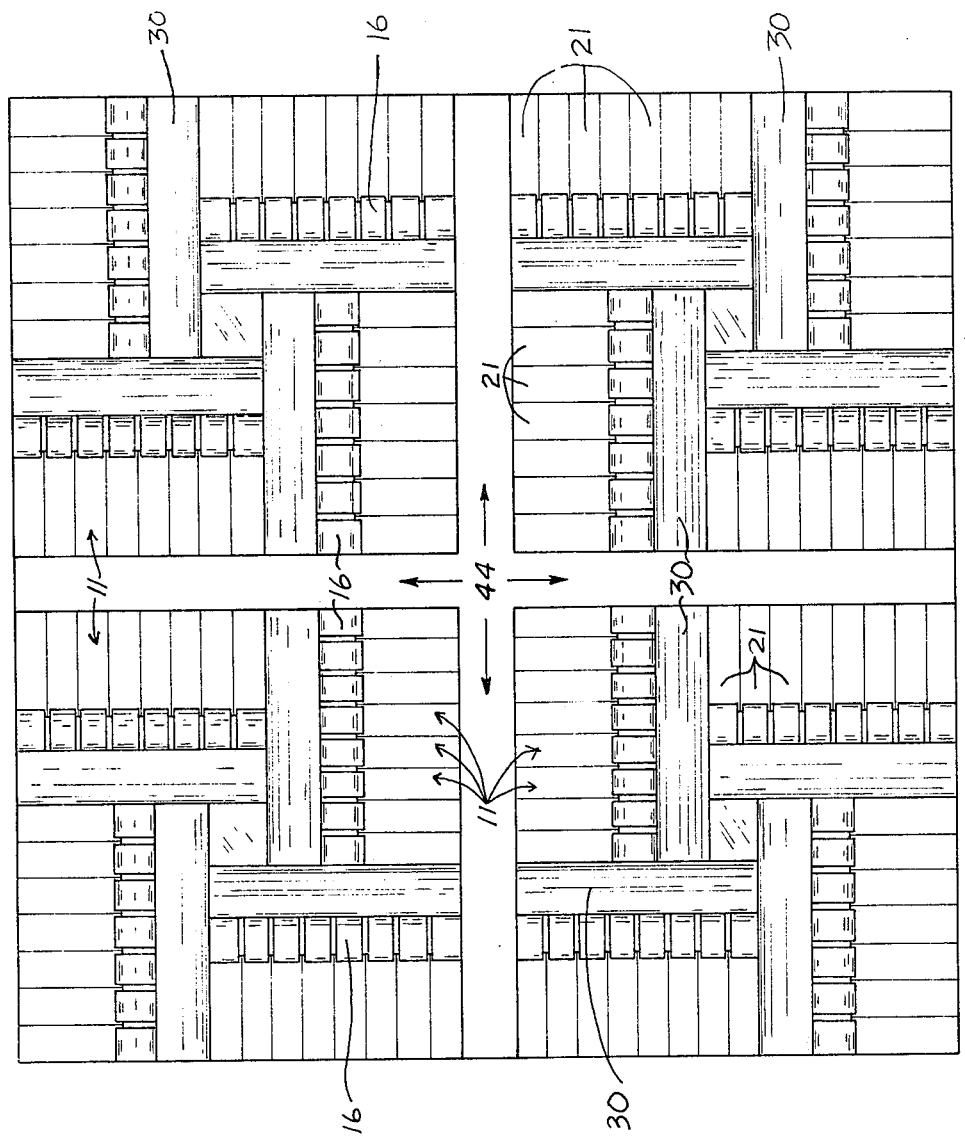
FIG. 6 is a top view of four kennel buildings joined together to form an exterior court.

The common area 12 has facilities for washing, grooming and storage of supplies and equipment for cleaning located in a central service core 45. All inside kenneling spaces are merely a few steps from the central service core 45. The double roof structures, 16 and 30, give a lower space over the animal enclosure 10 with the higher roof over the corridor 14 space. Between these roofs natural daylight is introduced through plastic panels 29. When four or more kennel buildings are arranged to form an exterior court as shown in FIG. 6, the sloped roofs 16 and 30 act as accoustic baffles directing sound upward. This closed court will house noisy animals and those with a tendency to climb out of fenced exercise areas. The outside runs 11 are sloped away from the enclosures 10 and have high concrete curbing 22 for sanitation purposes. Roofing drainage is directed toward run surfaces 21, utilizing rainfall for additional washing. Each enclosure 10 has a removable bed 46 making frequent replacement and cleaning very convenient.

The kennel buildings are intended to be a part of a larger complex which would have buildings of different design but similar architecture such as a service building, a hospital building, a training pavillion and an administration unit. In this fashion, an entire kennel can be planned in this modular form to give an aesthetically pleasing appearance while at the same time housing a large number of animals in as sanitary and noiseless conditions as are possible. In addition, the maximum isolation of the dogs from one another prevents the spread of disease such as worms and fleas. These considerations are extremely important to a dog owner who is seeking to kennel his dog.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention and the scope of the claims are also desired to be protected.

What is claimed is:

1. A modular kennel unit comprising:

several enclosures linearly arranged in a row having a first end and a second end, there being vertical walls separating each individual enclosure from other of said enclosures, each of said enclosures being covered by a first roof;

exercise housings adjacent said enclosures with a separate exercise housing provided for each of said enclosures;

each of said enclosures having a first opening into said exercise housing adapted to allow a dog to pass through;

each of said enclosures having a second opening, each of said second openings;
1. being adapted to allow a dog to pass through; and
2. having gate means to open or close the corresponding one of said second openings, said gate means permitting entrance to and exit from each individual enclosure of said several enclosures;

a wall spaced from said several enclosures and said second openings, so as to define a corridor between said wall and some of said enclosures and second openings, said corridor providing access to the second openings of some of said enclosures, said wall extending from said first end partially along the length of said row and terminating between said first end and said second end with said corridor extending only from said first end to the termination of said wall with an open common area provided from the termination of said wall to said second end;

a second roof over said corridor between said wall and said several enclosures, said second roof extending for the combined length of said several enclosures;

one of said roofs extending out from above said several enclosures for drainage purposes; and the kennel unit being adapted to be combined with three additional kennel units of similar design in a pinwheel configuration.

2. The modular kennel unit of claim 1 wherein each of said exercise areas including:

a floor area which is inclined downwardly from said enclosure;

a pair of side curbs extending upwardly from said floor area, and a fence extending vertically upward from and fixedly attached to said side curbs, said fence further extending between said side curbs so as to define a fenced perimeter;

said unit including a light emittable wall positioned between and spacing apart said first roof and said second roof and positioned to allow light to shine into said corridor and said common area.

3. The modular kennel unit of claim 2 wherein each of said first openings in each of said several enclosures includes second door means hingedly attached in said first opening, each of said first openings connecting each of said several enclosures to an exercise area.

4. A combination of the kennel units of claim 1 comprising joining four of said kennel units at approximately right angles to one another such that said walls of all four of said kennel units are joined to define a common area and four corridors.

* * * * *